US012602649B2

(12) United States Patent
Borjian et al.

(10) Patent No.: US 12,602,649 B2
(45) Date of Patent: Apr. 14, 2026

(54) PREDICTING SUPPLY CHAIN POLICIES USING MACHINE LEARNING

(71) Applicant: Oracle International Corporation, Redwood Shores, CA (US)

(72) Inventors: Setareh Borjian, New Haven, CT (US); Su-Ming Wu, Waltham, MA (US); Shenghao Wang, Iowa City, IA (US)

(73) Assignee: Oracle International Corporation, Redwood Shores, CA (US)

( * ) Notice: Subject to any disclaimer, the term of this patent is extended or adjusted under 35 U.S.C. 154(b) by 331 days.

(21) Appl. No.: 17/698,666

(22) Filed: Mar. 18, 2022

(65) Prior Publication Data

US 2023/0297948 A1      Sep. 21, 2023

(51) Int. Cl.
*G06Q 10/08* (2024.01)
*G06F 30/27* (2020.01)
*G06N 20/00* (2019.01)
*G06Q 10/087* (2023.01)
*G06Q 30/02* (2023.01)
*G06Q 30/0601* (2023.01)

(52) U.S. Cl.
CPC ....... *G06Q 10/087* (2013.01); *G06Q 30/0605* (2013.01)

(58) Field of Classification Search
CPC .......................... G06Q 10/087; G06Q 30/0605
See application file for complete search history.

(56) References Cited

U.S. PATENT DOCUMENTS

| | | | | |
|---|---|---|---|---|
| 7,216,086 B1* | 5/2007 | Grosvenor | ........... | G06Q 10/087 |
| | | | | 705/28 |
| 8,160,908 B2* | 4/2012 | Bennett | ................. | G06Q 10/06 |
| | | | | 705/37 |
| 8,626,558 B2* | 1/2014 | Dudley | ................. | G06Q 40/08 |
| | | | | 705/7.28 |
| 8,655,705 B2* | 2/2014 | Riepshoff | ........... | G06Q 10/087 |
| | | | | 705/348 |
| 2003/0187708 A1* | 10/2003 | Baydar | ............. | G06Q 10/0637 |
| | | | | 705/7.29 |
| 2005/0177435 A1* | 8/2005 | Lidow | .................... | G06Q 10/06 |
| | | | | 705/22 |
| 2018/0046974 A1* | 2/2018 | Helander | ............. | G06Q 10/087 |
| 2019/0228372 A1* | 7/2019 | Saylor | ...................... | G06N 7/01 |
| 2020/0126015 A1* | 4/2020 | Anandan Kartha | . | G06Q 10/087 |
| 2021/0356576 A1* | 11/2021 | Elias | ................ | G06Q 10/06398 |
| 2022/0044148 A1* | 2/2022 | Härmä | ................... | G06N 20/00 |

(Continued)

*Primary Examiner* — Talia F Crawley
(74) *Attorney, Agent, or Firm* — Potomac Law Group, PLLC

(57) ABSTRACT

Embodiments predict supply chain policies using machine learning. A machine learning model trained to predict one or more supply chain metrics for a first product can be stored. The machine learning model can generate a plurality of supply chain metric predictions for the first product using a plurality of candidate replenishment policies for the first product. A candidate replenishment policy with a corresponding supply chain metric prediction that meets a criteria can be selected. The selected replenishment policy can be implemented for the first product within an inventory system, where one or more physical locations are restocked with the first product based on restocking parameters defined by the selected replenishment policy.

20 Claims, 6 Drawing Sheets

(56)          References Cited

U.S. PATENT DOCUMENTS

| | | | |
|---|---|---|---|
| 2022/0292454 A1* | 9/2022 | Ellison | G06V 20/10 |
| 2023/0101023 A1* | 3/2023 | Jin | G06Q 10/087 |
| | | | 705/7.31 |
| 2023/0297948 A1* | 9/2023 | Borjian | G06Q 10/087 |
| | | | 705/28 |

* cited by examiner

STORING A TRAINED MACHINE LEARNING MODEL ~402

GENERATING SUPPLY CHAIN METRIC PREDICTIONS USING CANDIDATE POLICIES ~404

RANKING THE SUPPLY CHAIN METRIC PREDICTIONS ~406

SELECTING ONE OR MORE OF THE RANKED PREDICTIONS ~408

IMPLEMENTING THE SELECTED PREDICTION ~410

TRAINING A MACHINE LEARNING MODEL USING HISTORIC DATA AND SIMULATED DATA ~502

GENERATING PREDICTED SUPPLY CHAIN METRICS ~504

RECEIVING ACTUAL SUPPLY CHAIN METRICS DATA ~506

UPDATING THE TRAINING OF THE MACHINE LEARNING MODEL USING THE ACTUAL DATA ~508

PREDICTING SUPPLY CHAIN POLICIES USING MACHINE LEARNING

FIELD

The embodiments of the present disclosure generally relate to predicting supply chain policies using machine learning.

BACKGROUND

Modern trends in consumer behavior have created unique challenges for supply chain networks. For example, marketing campaigns, new products, online trends, global trends, and several other factors can significantly shift consumer behavior. These changes create selling opportunities and the risk of lost opportunities, and the opportunities and risks have different impacts on different products. As a result, techniques that can predict effective supply chain policies in modern market environments can delivery substantial value.

SUMMARY

Features and advantages of the embodiments are set forth in the description which follows, or will be apparent from the description, or may be learned by practice of the disclosure.

Systems and methods predict supply chain policies using machine learning. A machine learning model trained to predict one or more supply chain metrics for a first product can be stored. The machine learning model can generate a plurality of supply chain metric predictions for the first product using a plurality of candidate replenishment policies for the first product. A candidate replenishment policy with a corresponding supply chain metric prediction that meets a criteria can be selected. The selected replenishment policy can be implemented for the first product within an inventory system, where one or more physical locations are restocked with the first product based on restocking parameters defined by the selected replenishment policy.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Figure 1:
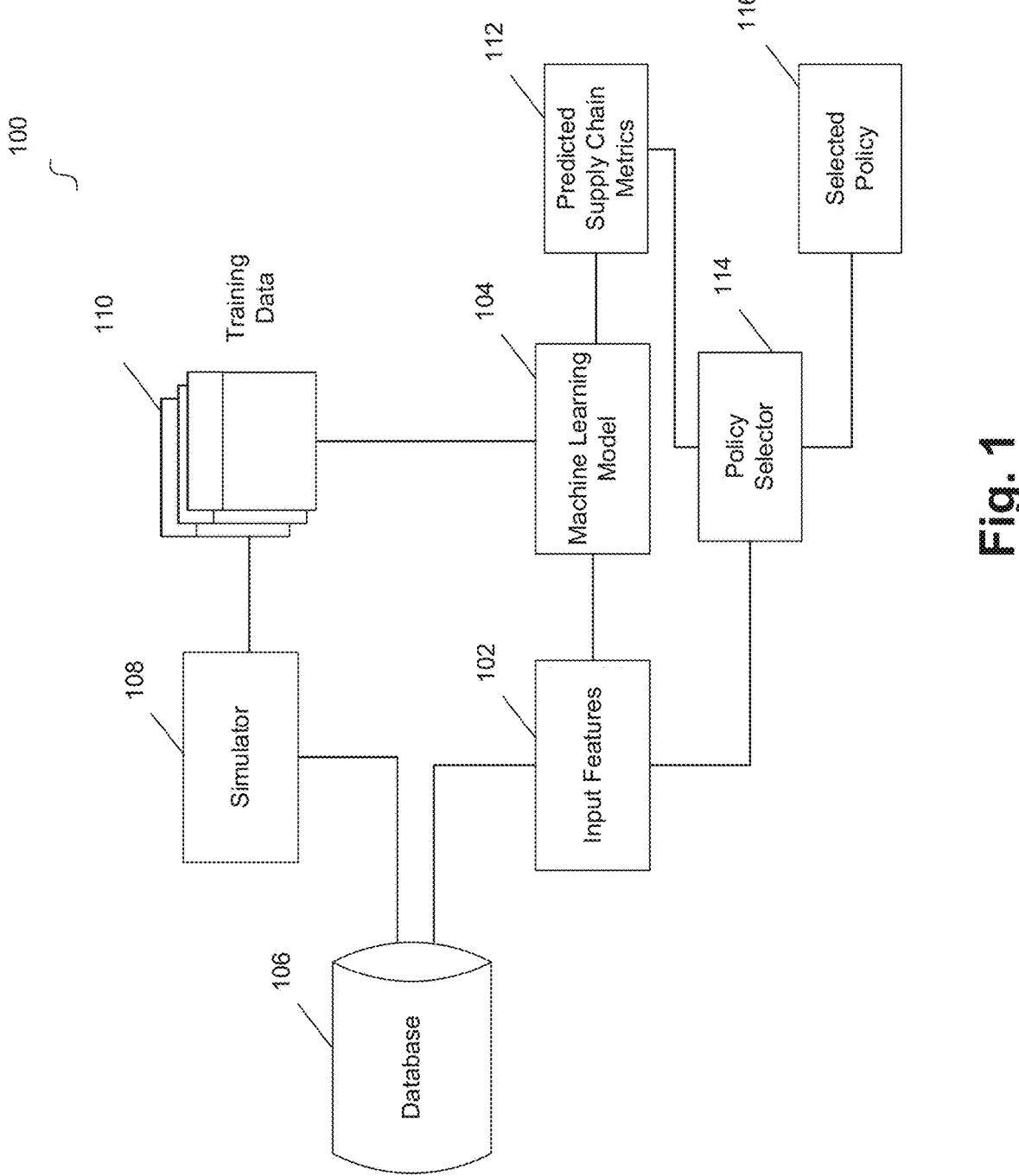
FIG. 1 illustrates a system for predicting supply chain policies using machine learning according to an example embodiment.

Embodiments predict supply chain policies using machine learning. A supply chain policy for a given product can include certain parameters, such as a minimum stock level and a maximum stock level. For example, when inventory levels fall below the minimum stock level, a replenishment order can be triggered that brings the inventory levels to the maximum stock level. Some implementations of supply chain policies for products can have a significant impact on supply chain metrics, such as sales, lost sales, on-hand inventory levels, and other suitable metrics.

Embodiments predict supply chain metrics using a trained machine learning model based on multiple candidate supply chain policies for a given product, where at least one of the candidate supply chain policies with corresponding predicted supply chain metrics that meet a criteria is selected for the given product. For example, the predicted supply chain metrics can be ranked, and the supply chain policy that corresponds to the highest ranked supply chain metric can be selected.

In some embodiments, the machine learning model can be trained using data generated by simulations. For example, seasonal or yearly simulations (e.g., planning simulations for the products given time windows, scenarios, and other suitable factors) can be generated for a set of products. However, the simulations can be resource and time intensive to perform. For example, the simulations can be implemented by planning software that requires significant manual effort to setup and significant computing resources to perform the simulations. Because of these constraints, simulations are typically run for a portion of products, leaving some existing and/or new products without comprehensive simulation data.

Based on the simulations run for the portion of products, embodiments train machine learning model(s) to generate a lightweight and efficient tool for selecting replenishment policies for new products (or for reconfiguring replenishment policies for the set of products). Implementations can select effective replenishment policies without extensive overhead associated with full scale simulations. In particular, the simulation data used for training can represent a diversity of demand characteristics and/or product factors. Thus, the trained machine learning model can learn trends across a variety of product features and demand features. This enhances the trained model's ability to generalize to new products and/or products with a shift in demand.

Some embodiments implement a random forest model or XG Boost model. In these implementations, the training cost associated with deep learning models is avoided. In addition, the trained model takes as input demand features and product features, which are readily available pieces of data, along with the candidate replenishment policies for the product. Accordingly, supply chain metric predictions can be quickly and efficiently computed by the trained model, enabling agile determination of replenishment policies (or adjustment of an existing replenishment policy). A selected replenishment policy can then be implemented. For example, a selected minimum stock and maximum stock can be implemented for a given product such that when inventory of the given product falls below the minimum stock, a replenishment order is triggered that raises the inventory level to the maximum stock.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for predicting supply chain policies using machine learning according to an example embodiment. System 100 includes input features 102, machine learning model 104, database 106, simulator 108, training data 110, predicted supply chain metrics 112, policy selector 114, and selected policy 116. Embodiments of system 100 can generate predicted supply chain metrics 112 for multiple candidate supply chain policies, and policy selector 114 can arrive at selected policy 116 by analyzing and/or ranking the predicted supply chain metrics 112 generated for the candidate policies.

In some embodiments, input features 102 can represent the features of one or more candidate supply chain policies and one or more products. For example, supply chain policies can be defined for a particular product (e.g., retail product), a product line, a particular product/product line and one or more locations (e.g., retail locations), or any other suitable combination of product(s) in retail settings.

Input features 102 can include features for the product/ product line (e.g., sales data, demand data, and the like) and the features for the supply chain policies (e.g., minimum stock and maximum stock, or other suitable policy features). In some embodiments, input features 102 can include product features (e.g., lead time for stocking, pack size, minimum order quantity, other suitable supply chain product attributes, and the like), demand features (e.g., data that represents demand of the product, such as mean demand and standard deviation), and policy features (e.g., minimum and maximum for a replenishment policy).

Machine learning model 104 can be configured to generate predicted supply chain metrics 112 using input features 102 that represent a given candidate supply chain policy and one or more product(s). In some embodiments, supply chain metrics 112 can be a predicted sales metric and/or a predicted stock on hand metric. In an example, for a given a candidate policy input features 102 that represent the given candidate policy can be input to machine learning model 104. In turn, one or more predicted supply chain metrics 112 that correspond to the given candidate policy can be generated by machine learning model 104.

In some embodiments, machine learning model 104 can receive multiple sets of input features 102 that represent multiple candidate policies, and multiples sets of predicted supply chain metrics 112 that correspond to each candidate policy can be generated. For example, for a given product (or product line), multiple candidate supply chain policies can be generated, each being defined by its own parameters (e.g., minimum and maximum, or other suitable parameters). In this example, multiple instances of input features 102 that represent the multiple candidate policies can be fed into machine learning model 104, and in turn multiple sets of predicted supply chain metrics 112 that correspond to each candidate policy can be generated. Accordingly, the predicted supply chain metrics 112 generated for each candidate policy can represent predicted metrics for the given product(s) if the candidate policy were implemented.

Policy selector 114 can generate selected policy 116 from among the multiple candidate policies based on their corresponding predicted supply chain metrics 112. For example, the predicted supply chain metrics can be ranked and the policy corresponding to the highest ranked metric(s) can be selected. Selected policy 116 can then be implemented for the product(s) and/or location(s).

Figure 2:
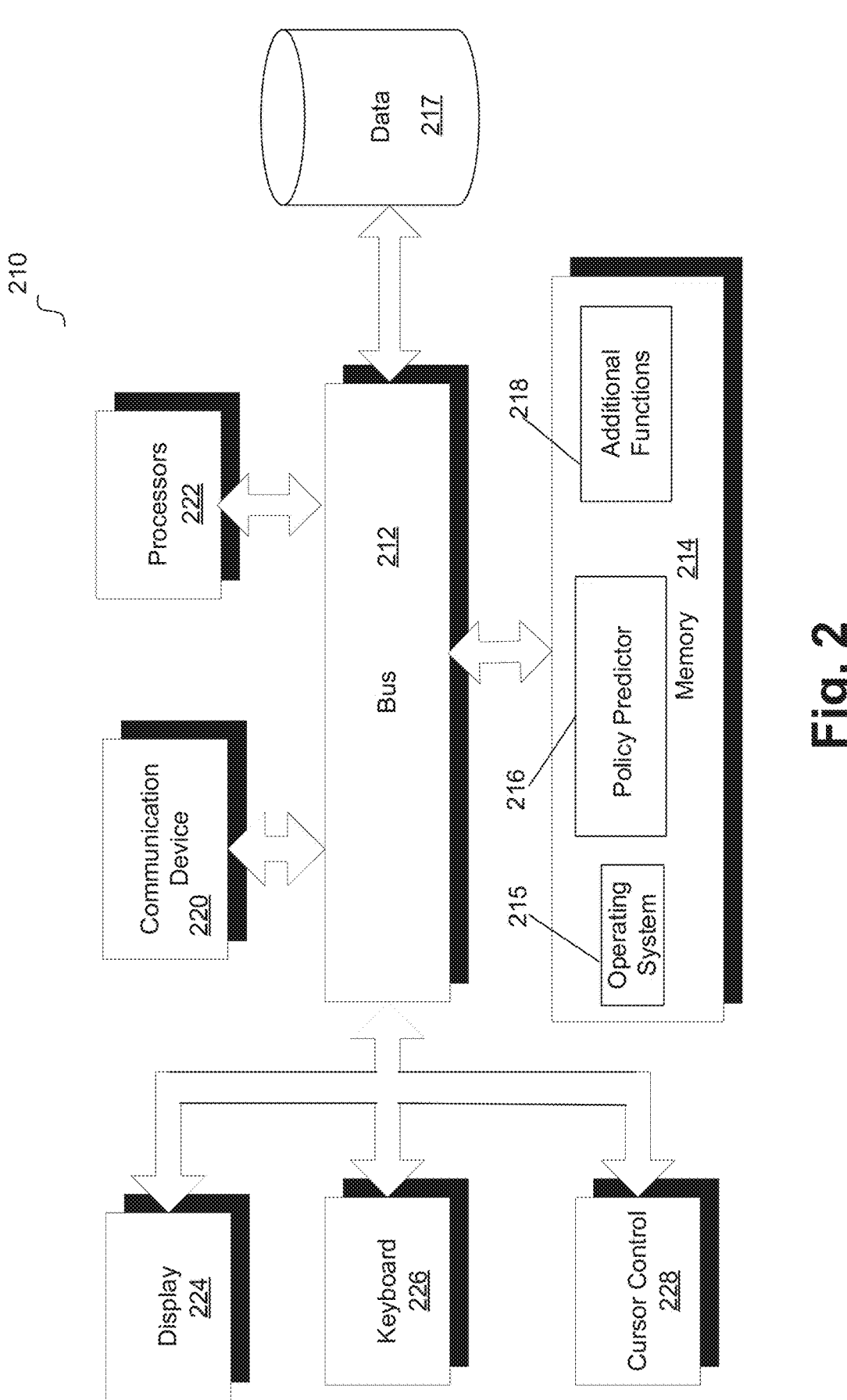
FIG. 2 illustrates a block diagram of a computing device operatively coupled to a prediction system according to an example embodiment.

FIG. 2 is a block diagram of a computer server/system 210 in accordance with embodiments. As shown in FIG. 2, system 210 may include a bus device 212 and/or other communication mechanism(s) configured to communicate information between the various components of system 210, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 210. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, policy predictor 216, and other applications 218, stored within memory 214.

System 210 may include memory 214 for storing information and instructions for execution by processor 222. Memory 214 may contain various components for retrieving, presenting, modifying, and storing data. For example, memory 214 may store software modules that provide functionality when executed by processor 222. The modules can include an operating system 215, policy predictor 216, as well as other applications modules 218. Operating system 215 provides operating system functionality for system 210. policy predictor 216 may provide system functionality for predicting supply chain policies for a product, or may further provide any other functionality of this disclosure. In some instances, policy predictor 216 may be implemented as an in-memory configuration.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium.

Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 210. In some embodiments, system 210 can be part of a larger system. Therefore, system 210 can include one or more additional functional modules 218 to include the additional functionality. Other applications modules 218 may include the various modules of the Oracle® Enterprise Resource Planning ("ERP") Cloud, Oracle® Data Science, Oracle® Retail Optimization, and/or Oracle® Retail Predictive Application Server, for example.

A database 217 is coupled to bus 212 to provide centralized storage for modules 216 and 218 and to store, for example, enterprise sales and product data, training data, simulator data, supply chain policies, etc. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, Hadoop Distributed File System ("HFDS"), or any other database known in the art.

Although shown as a single system, the functionality of system 210 may be implemented as a distributed system. For example, memory 214 and processor 222 may be distributed across multiple different computers that collectively represent system 210. In one embodiment, system 210 may be part of a device (e.g., smartphone, tablet, computer, etc.).

In an embodiment, system 210 may be separate from the device, and may remotely provide the described functionality for the device. Further, one or more components of system 210 may not be included. For example, for functionality as a user or consumer device, system 210 may be a smartphone or other wireless device that includes a processor, memory, and a display, does not include one or more of the other components shown in FIG. 2, and includes additional components not shown in FIG. 2.

Figure 3:
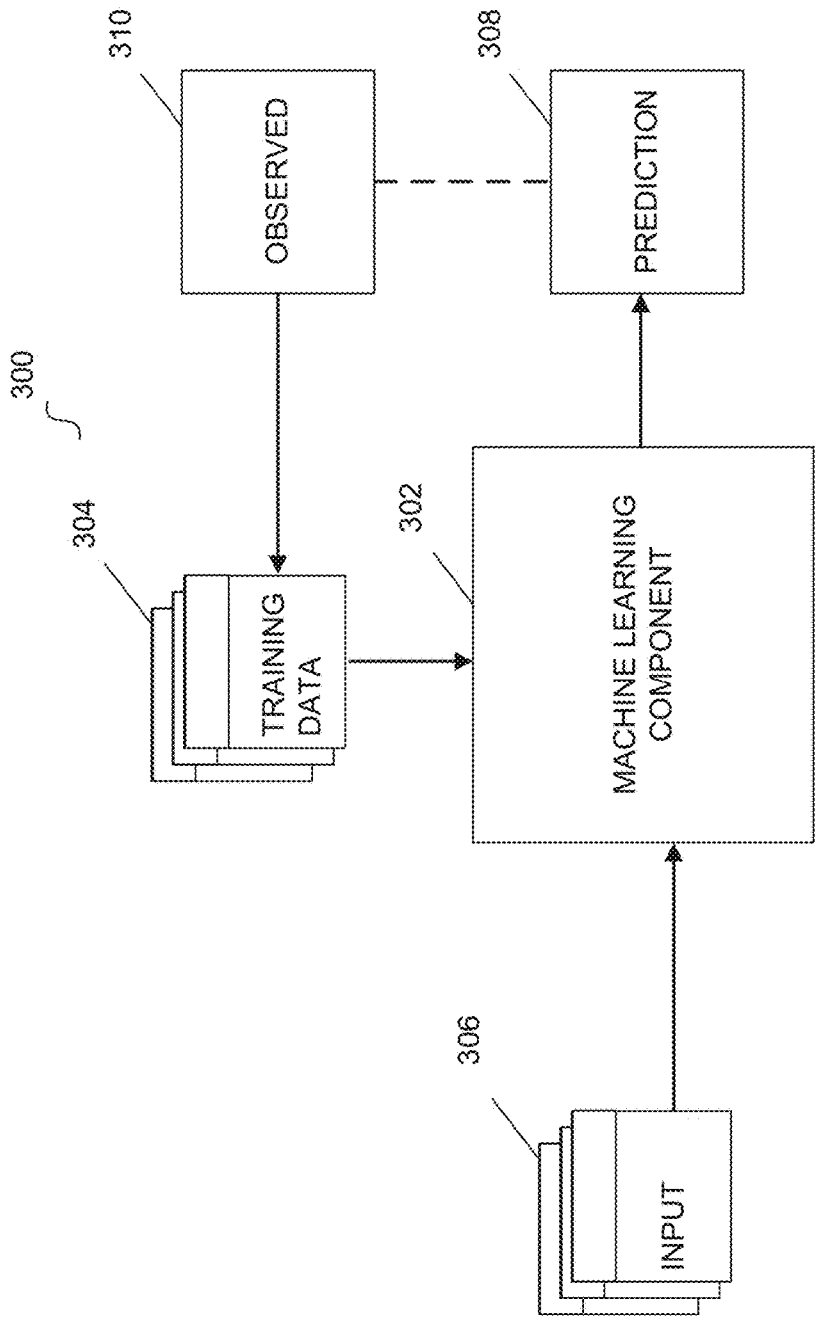
FIG. 3 illustrates a prediction system according to an example embodiment.

FIG. 3 illustrates a prediction system according to an example embodiment. System 300 includes machine learning component 302, training data 304, input data 306, prediction 308, and observed data 310. In some embodiments, machine learning component 302 can be a designed model that includes one or more machine learning elements (e.g., a neural network, support vector machine, Bayesian network, random forest classifier, gradient boosting classifier, and the like). Training data 304 can be any set of data capable of training machine learning component 302 (e.g., a set of features with corresponding labels, such as labeled data for supervised learning). In some embodiments, training data 304 can be used to train machine learning component 302 to generate a trained machine learning model.

In some embodiments, machine learning component 302 of FIG. 3 can be implemented by machine learning model 104 of FIG. 1. For example, a trained machine learning model may be configured to generate supply chain metric predictions based on a supply chain policy for product(s). In an example, training data 304 can include instances of product data (e.g., product features, demand data, and the like), supply chain policies for the product, historic supply chain metric data for the product (e.g., sales data, lost sales data, stock on hand data, and the like) and simulated supply chain metric data for the product. Accordingly, prediction 308 generated by machine learning component 302 trained by embodiments of training data 304 for a given supply chain policy and product can be predicted supply chain metrics for the product(s) given implementation of the supply chain policy.

In some embodiments, results for the predictions (e.g., supply chain metrics) can be observed. For example, upon implementing a supply chain policy, actual supply chain metrics can be observed for the product(s). This feedback can be retrieved (e.g., represented in FIG. 3 as observed data 310), and processed to update embodiments of training data 304.

The design of machine learning component 302 can include any suitable machine learning model components (e.g., a neural network, support vector machine, specialized regression model, random forest classifier, gradient boosting classifier, and the like). For example, a neural network can be implemented along with a given cost function (e.g., for training/gradient calculation). The neural network can include any number of hidden layers (e.g., 0, 1, 2, 3, or many more), and can include feed forward neural networks, recurrent neural networks, convolution neural networks, modular neural networks, and any other suitable type. In some embodiments, the neural network can be configured for deep learning, for example based on the number of hidden layers implemented. In some examples, a Bayesian network can be similarly implemented, or other types of supervised learning models.

For example, a support vector machine can be implemented, in some instances along with one or more kernels (e.g., gaussian kernel, linear kernel, and the like). In some embodiments, a k-nearest neighbor ("KNN") algorithm can be implemented. In some embodiments, machine learning component 302 can include an ensemble learning model. For example, machine learning component 302 can include a random forest classifier that includes multiple machine learning components whose predictions are combined. Implementations of the random forest classifier include decision trees that are trained by training data 304 (e.g., using subsets of the training data per tree). The random forest algorithm can then aggregate votes from these decision trees to arrive at a prediction.

In some embodiments, machine learning model 302 can include a gradient boosting learning algorithm, such as XGBoost. The gradient boosting algorithm can similarly leverage an ensemble learning technique with multiple decision trees trained using training data 304, however the gradient boosting algorithm can align decision trees in sequence. In this implementation, a tree later in the sequence learns to "correct" errors from predictions generated by earlier decision trees. The gradient boosting learning algorithm aggregates predictions generated by the individual decision trees to generate prediction 308. Individual decision trees can be trained using a recursive splitting algorithm that splits nodes of the tree (e.g., recursive binary splitting), or any other suitable training technique.

In some embodiments, machine learning component 302 can be multiple models stacked, for example with the output of a first model feeding into the input of a second model. Some implementations can include a number of layers of prediction models. In some embodiments, features of machine learning component 302 can also be determined. For example, feature engineering can be used to generate a set of features implemented by one or more machine learning models.

In some embodiments, the design of machine learning component 302 can be tuned during training, retraining, and/or updated training. For example, tuning can include adjusting a number of hidden layers in a neural network, adjusting a kernel calculation used to implement a support vector machine, and the like. This tuning can also include adjusting/selecting features used by the machine learning model. Embodiments include implementing various tuning configurations (e.g., different versions of the machine learning model and features) while training in order to arrive at a configuration for machine learning component 302 that, when trained, achieves desired performance (e.g., performs predictions at a desired level of accuracy, run according to desired resource utilization/time metrics, and the like).

In some embodiments, retraining and updating the training of machine learning component 302 can include training the model with updated training data. For example, the training data can be updated to incorporate observed data, or data that has otherwise been labeled (e.g., for use with supervised learning). In some embodiments, machine learning component 302 can include an unsupervised learning component. For example, one or more clustering algorithms, such as hierarchical clustering, k-means clustering, and the like, or unsupervised neural networks, such as an unsupervised autoencoder, can be implemented.

Referring back to FIG. 1, system 100 can be used to generate selected policy 116 for a particular product or product line. For example, input features 102 can include product features, demand features, and candidate policy features. The product features can include lead time for stocking, pack size, minimum order quantity, other suitable supply chain product attributes, and the like. The demand features can include data that represents demand of the product, such as mean demand and standard deviation. Other suitable demand features can also be implemented. The candidate policy features can represent a given candidate supply chain policy for the product, such as minimum and maximum for a replenishment policy (e.g., Receipt Point ("RP") and a Receive Up to Level ("RUTL")), or any other suitable policy features.

In some embodiments, machine learning model 104 can generate several sets of predicted supply chain metrics 112 for the product or product line. For example, a given product with the same product features and demand features can have several candidate supply chain policies with different definitions (e.g., different minimums and/or maximums). Machine learning model 104 can receive several instances of input features 102, where the instances include the product features, demand features, and different candidate supply chain features. In turn, the sets of predicted supply chain metrics 112 each can be generated by machine learning model 104 using an instance of input features 102. Accordingly, a given set of predicted supply chain metrics 112 (e.g., lost sales metric and stock on hand metric) can correspond to the given candidate supply chain policy used to generate the given set.

Machine learning model 104 can be trained to generate predicted supply chain metrics 112 by training data 110. For example, simulator 108 can access historic enterprise data stored at database 106 and generate portions of training data 110. In some embodiments, training data 110 can include instances of product data (e.g., product features, demand data, and the like), supply chain policies for the product, historic supply chain metric data for the product (e.g., sales data, lost sales data, stock on hand data, and the like) and simulated supply chain metric data for the product.

For example, the simulated supply chain metric data can be generated by simulator 108, which can include sophisticated data modeling software that accesses big data (e.g., enterprise data) stored at database 106. In some embodiments, the inputs to the sophisticated data modeling software for a given product can include historic retail data for the product at a monthly, weekly, or daily granularity that spans months, seasons, or years. For example, database 106 can include a multi-dimensional enterprise data model that stores product data at different dimensionalities and/or hierarchical levels, and the sophisticated data modeling software at simulator 108 can access this data to generate the simulated supply chain metric data.

In some embodiments, the data modeling software can perform a number of calculations to generate forecasts for the product (e.g., the simulated supply chain metric data), such as sales forecasts, inventory forecasts, and the like. For example, product forecasts for different supply chain policies (e.g., replenishment policies) can be generated, and a supply chain policy that achieves desired forecasts can be recommended for the product. In this embodiment, the data modeling software arrives at a recommended supply chain policy after iteratively calculating forecasts for several policies using large scale enterprise data and optimizing for a desired forecast.

In some embodiments, training data 110 can include both observed data and simulated data. For example, a portion of the supply chain policies for a product in the instances of training data 110 can be generated by the data modeling software of simulator 108 while another portion of the supply chain policies for the product can be policies implemented historically (e.g., stored at database 106). In another example, a portion of the supply chain metric data for the product in the instances of training data 110 can be generated by the data modeling software of simulator 108 while another portion of the supply chain metric data for the product can be historical/observed data (e.g., stored at database 106).

In some embodiments, simulator 108 can include Oracle® Retail Optimization and/or Oracle® Retail Predictive Application Server for performing the modeling, forecasting, optimizing, or simulations. Other suitable software and/or functionality for performing similar simulations/optimization can be implemented.

In some embodiments, training data 110 includes a diverse dataset representative of a larger population of data to provide machine learning model 104 improved predictive power. For example, a diverse training set can enable a trained machine learning model to predict the quality of different replenishment policies for items from different categories. An example data preparation pipeline that leverages data modeling software and simulations (e.g., simulator 108) is further described to achieve such a diverse training set.

First, a clustering method can be applied to historical supply chain metric data (e.g., product sales time series of available items and stores), such as K-Means clustering. For example, clusters of items/store locations with different sales patterns can be generated. One example technique is to create clusters based on the mean and standard deviation of historical sales. Different clusters of items/stores can be generated by the clustering, such as high rate of sales/high variation, high rate of sales/low variation, low rate of sales/high variation, and the like.

Next, for each cluster, different replenishment policies to simulate can be determined. In an example, a policy can be defined by a Receipt Point ("RP") and a Receive Up to Level ("RUTL"), where the RP represents the inventory level below which an order should be triggered and the RUTL denotes the target level of inventory when generating an order. An example technique to generate a useful range of RP/RUTL is based on rate of sales. The intuition behind this is that small values of RP/RUTL for high sellers will result in high lost sales and low service level, which is not a scenario of interest in the training data. On the other hand, large values of RP/RUTL for low sellers will result in service level of 100%, which is a trivial scenario to predict. A useful range of RP/RUTL is one that will achieve different values of service level between 90% and 100%.

For example, one can use policies with equal RP and RUTL where RP changes between the average sales over the coverage period and 1.5*the average sales over coverage period (where coverage period is the duration of lead time plus review time). Alternatively, policies can be generated with RP and RUTL being a linear combination of average sales and standard deviation of sales, such as RP=average sales over the coverage period+K*standard deviation of demand over lead time and RUTL=H*average daily sales+ RP. Changing the values of K and H will generate a range of policies that can be used in simulation. For example, K between 1 and 4 and H between 1 and 3 can generate a useful range.

Next, the set of replenishment policies can be further limited or adjusted based on the service level that is the output of simulations. For example, when service level is found to be close to 100% for an RP/RUTL policy for a given item/store cluster, policies with a much larger RP/RUTL can be excluded from simulations. Similarly, if the largest RP/RUTL policy results in a service level that is far from 100%, it will be useful to simulate with more aggressive policies (with larger values of RP/RUTL). Using this example data preparation pipeline, training data 110 can represent a diverse set of products, demands, and/or replenishment policies, and in turn machine learning model 104 can perform accurate predictions for different categories and/or types or products (e.g., products with a variety of demand patterns).

Once machine learning model 104 generates sets of predicted supply chain metrics 112 for corresponding candidate supply chain policies, the sets of predicted supply chain metrics 112 can be ranked by policy selector 114. For example, a set of predicted supply chain metrics 112 can include a lost sales metric (e.g., lost sales over a period of time) and a stock on hand metric (e.g., stock on hand over a period of time). These metrics can be ranked by policy selector 114 according to one or more ranking criteria. An example ranking formula can be: numeric score=lost sales*W1+stock on hand*W2, where W1 and W2 are configurable weights. In this example, a numeric score can be calculated for each candidate policy using its corresponding set of predicted supply chain metrics, and the numeric scores can be ranked (e.g., ascending, descending, or any other suitable numeric ranking).

In another example, a frontier curve can be generated that maps lost sales metric values to stock on hand metric values. When graphically depicted, an example frontier curve can plot possible lost sales metric values on the x-axis and, for each possible lost sales metric value, its y-value can be the smallest stock on hand metric value over all candidate policies that achieves that lost sales metric value. In some implementations, policies can be ranked according to the stock on hand metric values that map to a given lost sales metric value (e.g., ranking a policy with a lowest stock on hand metric value first and remaining policies/values in descending order).

Policy selector 114 can generate selected policy 116 by selecting a candidate policy that corresponds to one of the ranked predicted supply chain metrics 112. For example, a candidate policy that corresponds to the highest ranked predicted supply chain metrics 112 can be selected policy 116. In some implementations, an interface that plots data representative of the predicted supply chain metrics (e.g., graph of the frontier curve) can be displayed to a user, and the user can input selected policy 116 (e.g., select the policy using the interface).

Selected policy 116 can then be implemented for or by an enterprise or retail organization. For example, select policy 116 can have an RP and RUTL associated with the product or produce line that was represented by input features 102 (e.g., the product for which the predicted supply chain metrics 112 were generated). In some embodiments, a replenishment order of the product is triggered when stock of the product falls below the RP level and the triggered replenishment order has a quantity that will bring the product stock level up to the RUTL level. As describe above, the RP and RUTL levels are selected according to the ranked predicted supply chain metrics 112 (e.g., generated by machine learning model 104) so that metric targets for the product can be achieved.

Embodiments leverage lightweight machine learning models to predict optimized replenishment policies for products that substantially improve upon conventional techniques. For example, conventional techniques often rely on large scale simulations, such as those described above that involve big data and a large number of calculations. These conventional techniques often involve simulating several different policies for particular products and/or locations, such as stock keeping unit ("SKU") and store combinations. For example, the number of simulations can be represented by the number of SKU-location variations multiplied by the number of policies for simulation. In large scale systems, the number of simulations can become excessively large. Indeed, often certain SKU-location combinations may not have an optimal policy calculated because of the resource constraints presented by the volume of data and inefficient processing techniques.

Embodiments of the trained machine learning model achieve replenishment policy prediction without this excessive computing resource overhead. For example, instead of relying on large scale simulations for each product location combination, a relatively small number of simulations can be run (e.g., using products/locations that represent a diverse set of circumstances and/or demand patterns) to generate training data for training a machine learning model. Because the trained model can scale to several different product types (e.g., products with different types of demand patterns) effective replenishment policies for several products can be predicted without the need for product (or produce line) specific large scale simulations. In addition, the embodiments that implement random forest models or XG Boost models can efficiently train the machine learning model in comparison to deep learning models that require substantially more computing resources.

Because conventional simulations require significant manual and computational resources, conventional simulations for products may be run infrequently or not at all for some products. When conventional simulations are performed, because policy comparison involves running simulations for several policies, resource usage becomes excessive. The computing efficiencies achieved by embodiments enable replenishment policy prediction to be performed with greater frequency and/or for products that traditionally did not have performed simulations. The overall result achieves a more efficient supply chain that implements replenishment policies optimized for a greater number of products.

Figure 4:
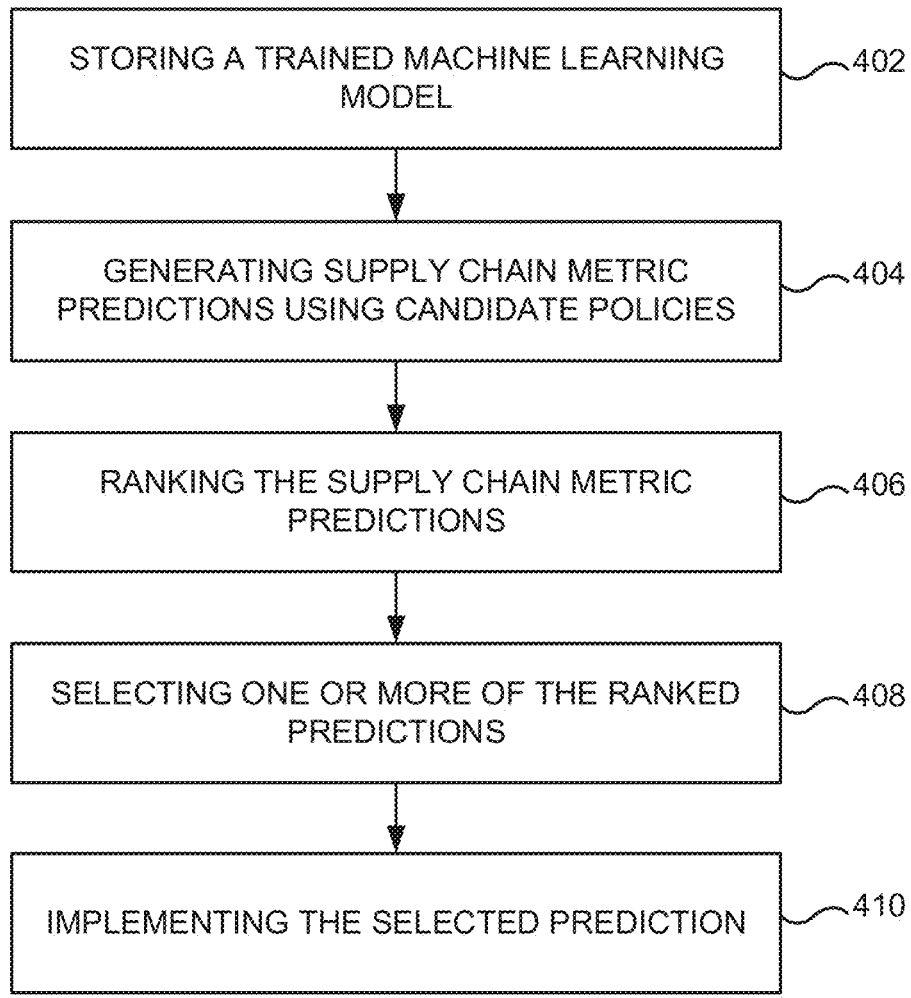
FIG. 4 illustrates a flow diagram for predicting supply chain policies using machine learning according to an example embodiment.

FIG. 4 illustrates a flow diagram for predicting supply chain policies using machine learning according to an example embodiment. In one embodiment, the functionality of FIG. 4 (and FIG. 5 below) is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 402, a machine learning model trained to predict one or more supply chain metrics for a first product can be stored. For example, the machine learning model can be trained by historic data and simulated data that configures the model to predict supply chain metrics for the first product. In some embodiments, the model is configured to receive, as input, product features, demand features, and policy features and generate predicted supply chain metrics corresponding to the input. In some embodiments, the machine learning model includes one of more of a random forest model and a XG boost model.

At 404, a plurality of supply chain metric predictions can be generated, by the machine learning model, for the first product using a plurality of candidate replenishment policies for the first product. For example, different candidate replenishment polices can be generated for the first product. The candidate replenishment policies can each be defined by a minimum level (e.g., RP level) and a maximum level (e.g., RUTL level).

In some embodiments, the supply chain metric predictions are generated by the machine learning model using input for the first product, the input including the candidate replenishment policies and demand features for the first product. In some embodiments, instances of input data that include product features of the first product, demand features of the first product, and features of different replenishment policies can be fed to the machine learning model. Each candidate supply chain policy can have corresponding supply chain metric predictions generated by the machine learning model. In some embodiments, demand features for the first product can include one or more of mean and standard deviation for product demand, and product features for the first product can include one or more of lead time for replenishment, pack size, and minimum order quantity.

At 406, the plurality of supply chain metric predictions can be ranked, where the selected candidate replenishment policy corresponds to a highest ranked supply chain metric prediction. For example, for each candidate policy, a set of predicted supply chain metrics can be generated, such as a lost sales metric and a stock on hand metric. The sets of metrics can be ranked according to a ranking criteria. In some embodiments, a numeric score can be calculated for each set of metrics, and the numeric scores can be ranked (e.g., ascending, descending, or any other suitable numeric ranking).

At 408, a candidate replenishment policy with a corresponding supply chain metric prediction that meets a criteria can be selected. For example, the candidate policy that corresponds to the highest ranked set of predicted supply chain metrics (e.g., ranked by numeric score) can be selected. The output at 408 may be in the form of a specialized data structure that can be used with fully automated manufacturing, inventory, and logistic systems, as described more fully below.

At 410, the selected replenishment policy can be implemented for the first product within an inventory system, where one or more physical locations are restocked with the first product based on restocking parameters defined by the replenishment policy. For example, the selected policy can have a minimum level (e.g., RP level) and maximum level (e.g., RUTL level). In some embodiments, a replenishment order of the product is triggered when stock of the first product falls below the RP level and the triggered replenishment order is generated with a quantity that will bring the first product stock level up to the RUTL level.

Figure 5:
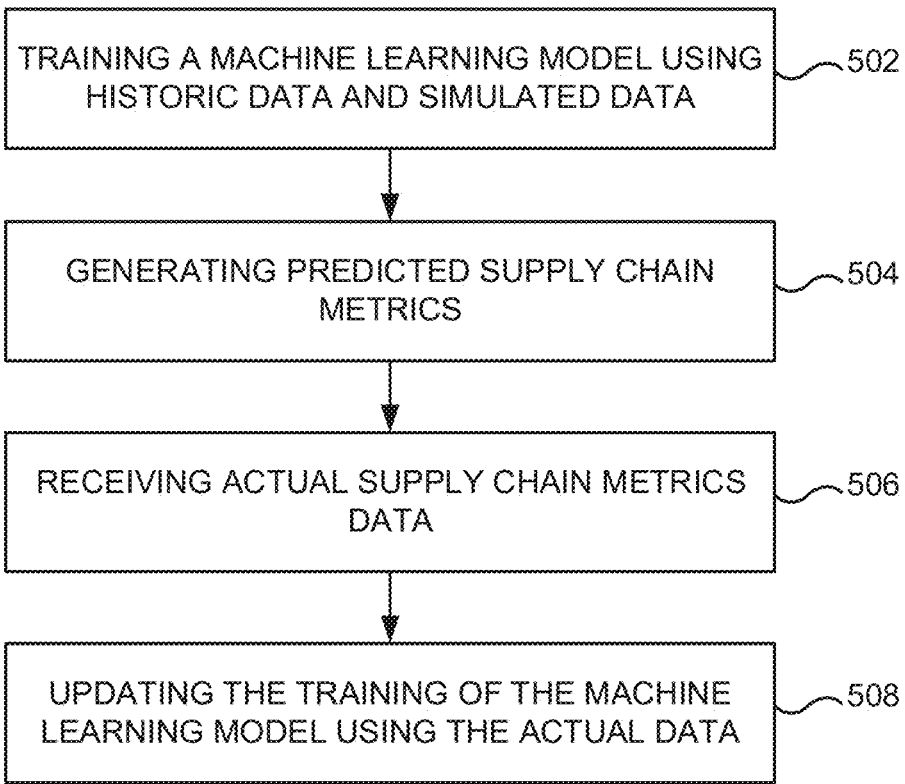
FIG. 5 illustrates a flow diagram for training and updating a machine learning model using simulated data according to an example embodiment.

FIG. 5 illustrates a flow diagram for training and updating a machine learning model using simulated data according to an example embodiment. For example, the functionality of FIG. 4 can be accomplished using a machine learning model trained using the functionality of FIG. 5.

At 502, a machine learning model can be trained using training data that includes historic data and simulated data.

For example, the historic data can include product data, supply chain metric data (e.g., sales data, lost sales data, stock on hand data), and replenishment policy data, and the simulated data can include simulated supply chain metric data and replenishment policy data. The simulated data can be generated by a simulator implemented by data modeling software. For example, the simulator can access historic enterprise data stored at database and generate portions of the training data.

In some embodiments, the inputs to the data modeling software for a given product can include historic retail data for the product at a monthly, weekly, or daily granularity that spans months, seasons, or years. For example, a database can include a multi-dimensional enterprise data model that stores product data at different dimensionalities and/or hierarchical levels, and the data modeling software at the simulator can access this data to generate the simulated data.

In some embodiments, the data modeling software can perform a number of calculations to generate forecasts for the product (e.g., the simulated supply chain metric data), such as sales forecasts, inventory forecasts, and the like. For example, product forecasts for different supply chain policies (e.g., replenishment policies) can be generated, and a supply chain policy that achieves desired forecasts can be recommended for the product. In this embodiment, the data modeling software arrives at a recommended supply chain policy after iteratively calculating forecasts for several policies using large scale enterprise data and optimizing for a desired forecast.

In some embodiments, the training data that includes historic data and simulated data can be used to train the machine learning model such that that the model is configured to: receive as input product features, demand features, and candidate policy features; and generate as output a set of predicted supply chain metrics for the input. For example, the machine learning model can be a random forest model and/or a XG boost model.

At 504, the trained machine learning model can be used to generate a set of predicted supply chain metrics. For example, several sets of supply chain metrics can be generated for many different candidate replenishment policies for a given product. In another example, the trained machine learning model can be used to generate predicted supply chain metrics for many different products.

At 506, actual supply chain metric data can be observed. For example, referring to FIG. 4 at 410, a replenishment policy can be selected and implemented for a given product. In some implementations, the functionality of FIG. 4 can be used to select and implement replenishment policies for numerous different kinds of products. Implementations of the replenishment policies includes triggering replenishment orders of the relevant products at defined times and of defined quantities (according to the policies). Based on sales and stock of the products, actual supply chain metric data (e.g., sales data, lost sales data, stock on hand data, and the like) can be observed while the policies are implemented. The actual data can be stored in a database.

At 508, the machine learning model can be trained using updating training data that incorporates the actual data observed and stored. For example, the training data can be updated to include the observed data (which can be considered historic data at the time of updated training). The machine learning model can be retrained using the updated training data, a new instance of the machine learning model can be trained using the updated training data, or any other suitable update to the training of the machine learning model can be performed.

Figure 6:
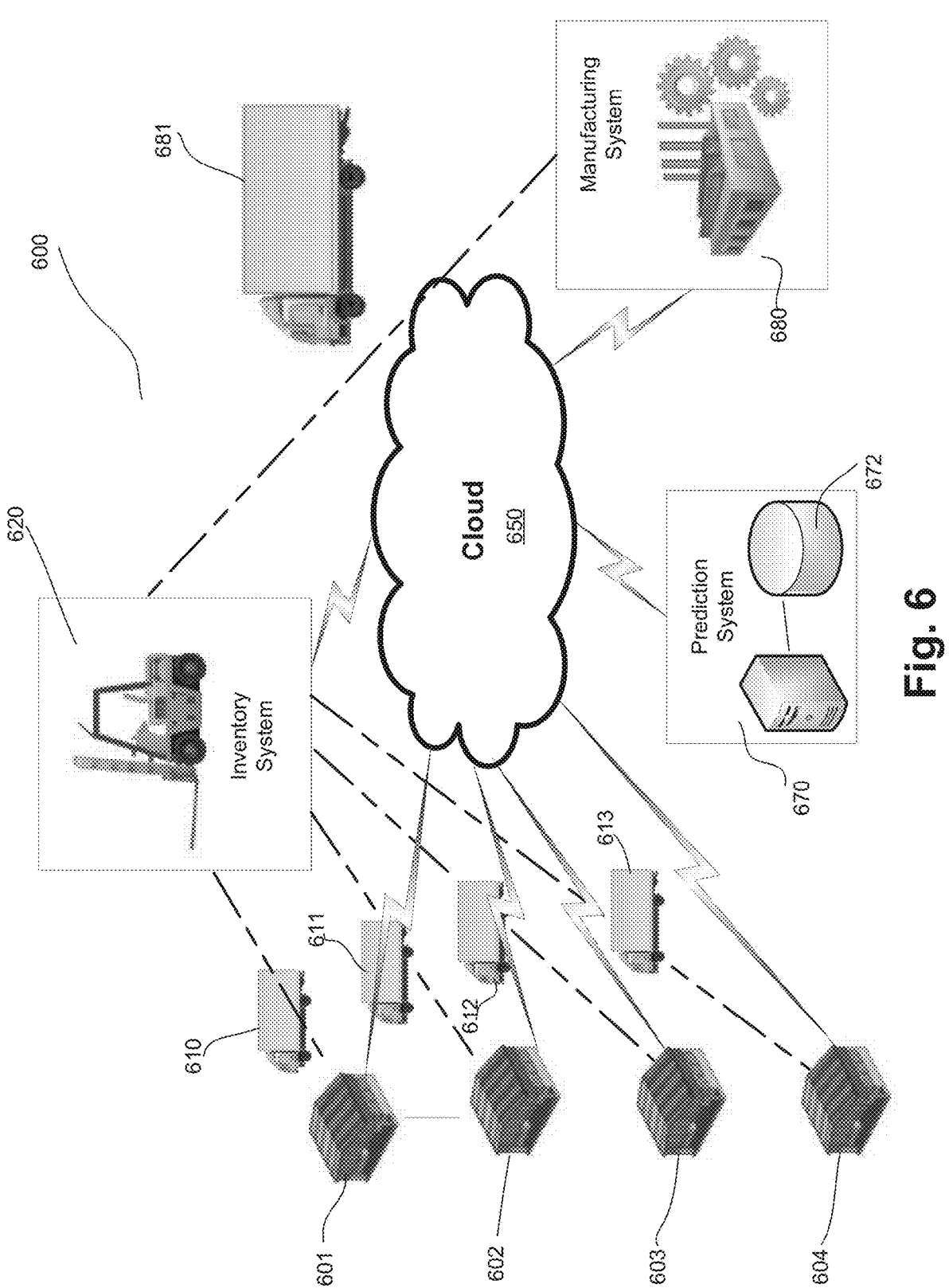
FIG. 6 illustrates an integrated manufacturing, inventory and logistics system that includes supply chain policy prediction as disclosed according to an example embodiment.

FIG. 6 illustrates an integrated manufacturing, inventory and logistics system 600 that includes supply chain predictions using an optimized policy as disclosed herein in accordance with one embodiment. Embodiments can use the optimized replenishment policy to fully automate some processes. For example, system 100 of FIG. 1 can generate replenishment orders based on the selected replenishment policy from an inventory management system, the electronic order causing a reallocated amount of the retail item to be sent, using a transportation mechanism, from one or more warehouses to one or more retail stores as well as fulfilling the generated electronic order at one or more of the plurality of warehouses.

As shown in FIG. 6, system 600 can include a prediction system 670 that predictions replenishments policies for tens, hundreds, or thousands of products, or in some implementations millions or more products at one or more retail stores 601-604. Prediction system 670 is in communication through a cloud network 650 or other type of communications network with one or more inventory systems 620 and one or more manufacturing systems 680.

Prediction system 670 generates optimized replenishment policies by implementing the functionality disclosed in conjunction with FIGS. 1-5. The policies can be implemented as an electronic inventory order signal that is sent to an inventory system and, as a result, automates the movement of inventory of an item to at least one store. Inventory system 620 stores inventory and provides transportation logistics to deliver items to stores 601-604 using trucks 610-613 or some other transportation mechanisms. Inventory system 620 in one embodiment implements an Enterprise Resource Planning ("ERP") specialized computer system or a specialized inventory control system that uses input from prediction system 670 to determine levels of inventories and the amount and timing of the delivery of items to stores 601-604. The functionality of FIG. 6 can be completely automated in some embodiments using automated loading mechanisms and self-driving transportation and specialized data structures and software.

Manufacturing system 680 manufactures items to be sent to inventory system 620 and provides transportation logistics to deliver the items to inventory system 620 using a truck 681 or some other transportation mechanisms. Manufacturing system 680 in one embodiment implements an ERP specialized computer system or a specialized manufacturing system that uses input from prediction system 670 to ascertain an amount of items to manufacture, inventory of resources that are used for the manufacturing, and the amount and timing of the delivery of items to inventory system 620.

Prediction system 670 can utilize information from inventory system 620, a sales tracking system (not shown) and/or databases for predicting replenishment policies for products. In general, the elements of FIG. 6 perform sales, manufacturing, or consumption of inventory. Retail locations/stores 601-604 for direct consumer sales exhibit volatile inventory patterns, for example due to random nature and external factors affecting sales. However, manufacturing facilities and sites that consume inventory (such as product integrators, internet shippers, etc. products used in the local facility) also benefit from an optimized supply chain.

In particular configurations, the disclosed embodiments may be employed in conjunction with specialized and/or particularly high volume retail sales environments. In large logistics and distribution operations, it is beneficial to load trucks as full as possible, and in the event deferral of items to a successive trip is needed, to select those items which will have a least likely chance of interrupting sales activity. Accordingly, embodiments are operable in conjunction with a point of sales system to identify high velocity or high turnover items that tend to be sold and replenished faster than other items. A high velocity item may be accommodated by identifying, for each of a plurality of items represented in an inventory database, a field for a product identifier, and determining, for each of the product identifiers, a product segmentation field based on product velocity indicative of increased product replenishment demands resulting from a sales volume.

Embodiments, including the predicted replenishment policies, may be employed in implementing supply logistics and designating deliveries (i.e., trucks) and manifest (i.e., contained items) in accordance with demand and profit margins of the transported items. High velocity items might be deemed to have priority space on a particular delivery, but could further be selected based on a profit margin or markup on the included items, and items with the greatest revenue generation potential selected for inclusion.

Embodiments predict supply chain policies using machine learning. A supply chain policy for a given product can include certain parameters, such as a minimum stock level and a maximum stock level. For example, when inventory levels fall below the minimum stock level, a replenishment order can be triggered that brings the inventory levels to the maximum stock level. Some implementations of supply chain policies for products can have a significant impact on supply chain metrics, such as sales, lost sales, on-hand inventory levels, and other suitable metrics.

Embodiments predict supply chain metrics using a trained machine learning model based on multiple candidate supply chain policies for a given product, where at least one of the candidate supply chain policies with corresponding predicted supply chain metrics that meet a criteria is selected for the given product. For example, the predicted supply chain metrics can be ranked, and the supply chain policy that corresponds to the highest ranked supply chain metric can be selected.

In some embodiments, the machine learning model can be trained using data generated by simulations. For example, seasonal or yearly simulations (e.g., planning simulations for the products given time windows, scenarios, and other suitable factors) can be generated for a set of products. However, the simulations can be resource and time intensive to perform. For example, the simulations can be implemented by planning software that requires significant manual effort to setup and significant computing resources to perform the simulations. Because of these constraints, simulations are typically run for a portion of products, leaving some existing and/or new products without comprehensive simulation data.

Based on the simulations run for the portion of products, embodiments train machine learning model(s) to generate a lightweight and efficient tool for selecting replenishment policies for new products (or for reconfiguring replenishment policies for the set of products). Implementations can select effective replenishment policies without extensive overhead associated with full scale simulations. In particular, the simulation data used for training can represent a diversity of demand characteristics and/or product factors. Thus, the trained machine learning model can learn trends across a variety of product features and demand features. This enhances the trained model's ability to generalize to new products and/or products with a shift in demand.

Some embodiments implement a random forest model or XG Boost model. In these implementations, the training cost associated with deep learning models is avoided. In addition, the trained model takes as input demand features and product features, which are readily available pieces of data, along with the candidate replenishment policies for the product. Accordingly, supply chain metric predictions can be quickly and efficiently computed by the trained model, enabling agile determination of replenishment policies (or adjustment of an existing replenishment policy). A selected replenishment policy can then be implemented. For example, a selected minimum stock and maximum stock can be implemented for a given product such that when inventory of the given product falls below the minimum stock, a replenishment order is triggered that raises the inventory level to the maximum stock.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for predicting supply chain policies using machine learning, the method comprising:

generating, using simulation software and one or more processors, simulated training data by performing simulations, for a first set of products and variety of replenishment policies, to generate simulated supply chain metric data labels;

generating mixed training data by combining the simulated trained data with historic training data, wherein the historic training data corresponds to historic supply chain metric data labels for a second set of products;

training, using the one or more processors via supervised learning, a machine learning model, using the mixed training data via the simulated supply chain metric data labels and the historic supply chain metric data labels, to generate supply chain predictions for one or more products;

generating, by the trained machine learning model using the one or more processors, a plurality of supply chain metric predictions for a first product using a plurality of candidate replenishment policies for the first product, wherein, for each of the candidate replenishment policies, the trained machine learning model generates a set of supply chain metric predictions that represents predicted performance of the first product, and wherein the simulation software performs the simulations without generating supply chain predictions via the trained machine learning model;

selecting, using the one or more processors, a candidate replenishment policy with a corresponding set of supply chain metric predictions that meets a criteria; and implementing, using the one or more processors, the selected replenishment policy for the first product within an inventory system, wherein one or more physical locations are restocked with the first product based on restocking parameters defined by the selected replenishment policy.

2. The method of claim 1, wherein the sets of supply chain metric predictions are generated by the machine learning model using input for the first product, the input comprising the candidate replenishment policies, product features for the first product, and demand features for the first product.

3. The method of claim 2, wherein the demand features for the first product comprise one or more of mean and standard deviation for product demand, and the product features for the first product comprise one or more of lead time for replenishment, pack size, and minimum order quantity.

4. The method of claim 1, further comprising:

ranking the sets of supply chain metric predictions, wherein the selected candidate replenishment policy corresponds to a highest ranked set of supply chain metric predictions.

5. The method of claim 1, wherein the sets of supply chain metric predictions comprise a lost sales metric for the first product, and the sets of supply chain metric predictions are ranked according to the lost sales metric.

6. The method of claim 5, wherein the sets of supply chain metric predictions comprise the lost sales metric and an inventory on hand metric for the first product.

7. The method of claim 1, wherein the candidate replenishment policies comprise a minimum stock level and maximum stock level for the first product.

8. The method of claim 1, wherein the machine learning model comprises one of more of a random forest model and a XG boost model.

9. The method of claim 1, wherein the simulated labeled training data comprises instances of the first set of products, demand features for the product instances, replenishment policies for the product instances, and the simulated supply chain metric data labels.

10. A non-transitory computer readable medium having instructions stored thereon that, when executed by a processor, cause the processor to predict supply chain policies using machine learning, wherein, when executed, the instructions cause the processor to:

generate, using simulation software, simulated training data by performing simulations, for a first set of products and variety of replenishment policies, to generate simulated supply chain metric data labels;

generate mixed training data by combining the simulated trained data with historic training data, wherein the historic training data corresponds to historic supply chain metric data labels for a second set of products;

train, via supervised learning, a machine learning model, using the mixed training data via the simulated supply chain metric data labels and the historic supply chain metric data labels, to generate supply chain predictions for one or more products;

generate, by the trained machine learning model, a plurality of supply chain metric predictions for a first product using a plurality of candidate replenishment policies for the first product, wherein, for each of the candidate replenishment policies, the trained machine learning model generates a set of supply chain metric predictions that represents predicted performance of the first product, and wherein the simulation software performs the simulations without generating supply chain predictions via the trained machine learning model;

select a candidate replenishment policy with a corresponding supply chain metric prediction that meets a criteria; and implement the selected replenishment policy for the first product within an inventory system, wherein one or more physical locations are restocked with the first product based on restocking parameters defined by the selected replenishment policy.

11. The computer readable medium of claim 10, wherein the sets of supply chain metric predictions are generated by the machine learning model using input for the first product, the input comprising the candidate replenishment policies, product features for the first product, and demand features for the first product.

12. The computer readable medium of claim 11, wherein the demand features for the first product comprise one or more of mean and standard deviation for product demand, and the product features for the first product comprise one or more of lead time for replenishment, pack size, and minimum order quantity.

13. The computer readable medium of claim 10, wherein, when executed, the instructions further cause the processor to:

ranking the sets of supply chain metric predictions, wherein the selected candidate replenishment policy corresponds to a highest ranked set of supply chain metric predictions.

14. The computer readable medium of claim 10, wherein the sets of supply chain metric predictions comprise a lost sales metric for the first product, and the sets of supply chain metric predictions are ranked according to the lost sales metric.

15. The computer readable medium of claim 14, wherein the sets of supply chain metric predictions comprise the lost sales metric and an inventory on hand metric for the first product.

16. The computer readable medium of claim 10, wherein the candidate replenishment policies comprise a minimum stock level and maximum stock level for the first product.

17. A system for predicting supply chain policies using machine learning, the system comprising:

a processor; and a memory storing instructions for execution by the processor, the instructions configuring the processor to:

generate, using simulation software, simulated training data by performing full-scale simulations, for a first set of products and variety of replenishment policies, to generate simulated supply chain metric data labels;

generate mixed training data by combining the simulated trained data with historic training data, wherein the historic training data corresponds to historic supply chain metric data labels for a second set of products;

train, via supervised learning, a machine learning model, using the mixed training data via the simulated supply chain metric data labels and the historic supply chain metric data labels, to generate supply chain predictions for one or more products;

generate, by the trained machine learning model, a plurality of supply chain metric predictions for a first product using a plurality of candidate replenishment policies for the first product, wherein, for each of the candidate replenishment policies, the trained machine learning model generates a set of supply chain metric predictions that represents predicted performance of the first product, and wherein the simulation software performs the simulations without generating supply chain predictions via the trained machine learning model;

select a candidate replenishment policy with a corresponding supply chain metric prediction that meets a criteria; and implement the selected replenishment policy for the first product within an inventory system, wherein one or more physical locations are restocked with the first product based on restocking parameters defined by the selected replenishment policy.

18. The method of claim 1, wherein training instances of the simulated training data comprise demand features for the first set of products, training instances of the historic training data comprise demand features for the second set of products, and the sets of supply chain metric predictions are generated by the trained machine learning model using input for the first product, the input comprising the candidate replenishment policies and the demand features for the first product.

19. The method of claim 18, wherein the demand features comprise one or more of mean and standard deviation for product demand.

20. The method of claim 1, wherein the trained machine learning model generates the supply chain predictions with greater computational efficiency than the simulation software performs the simulations.

\* \* \* \* \*